Patented Jan. 5, 1926.

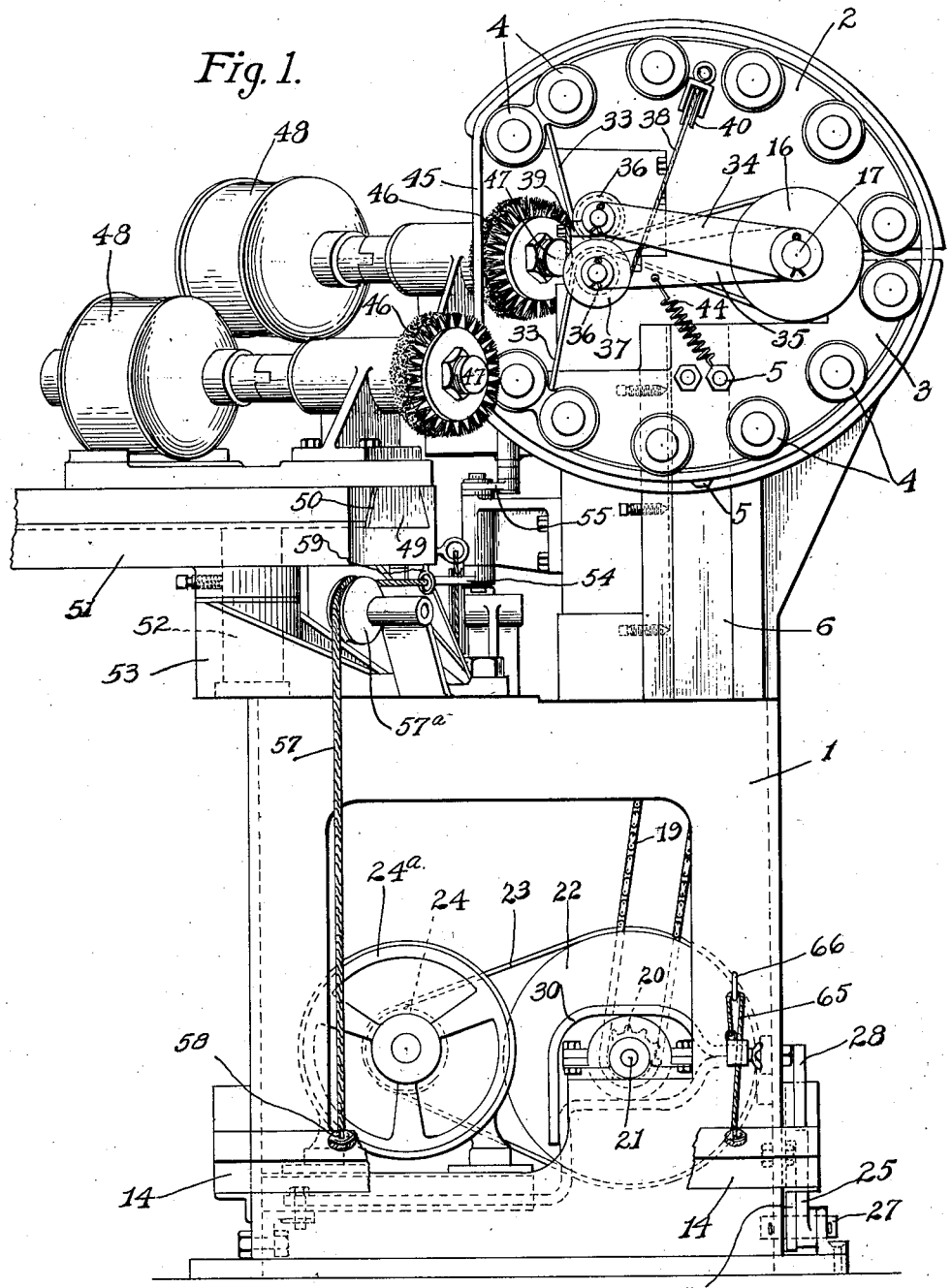

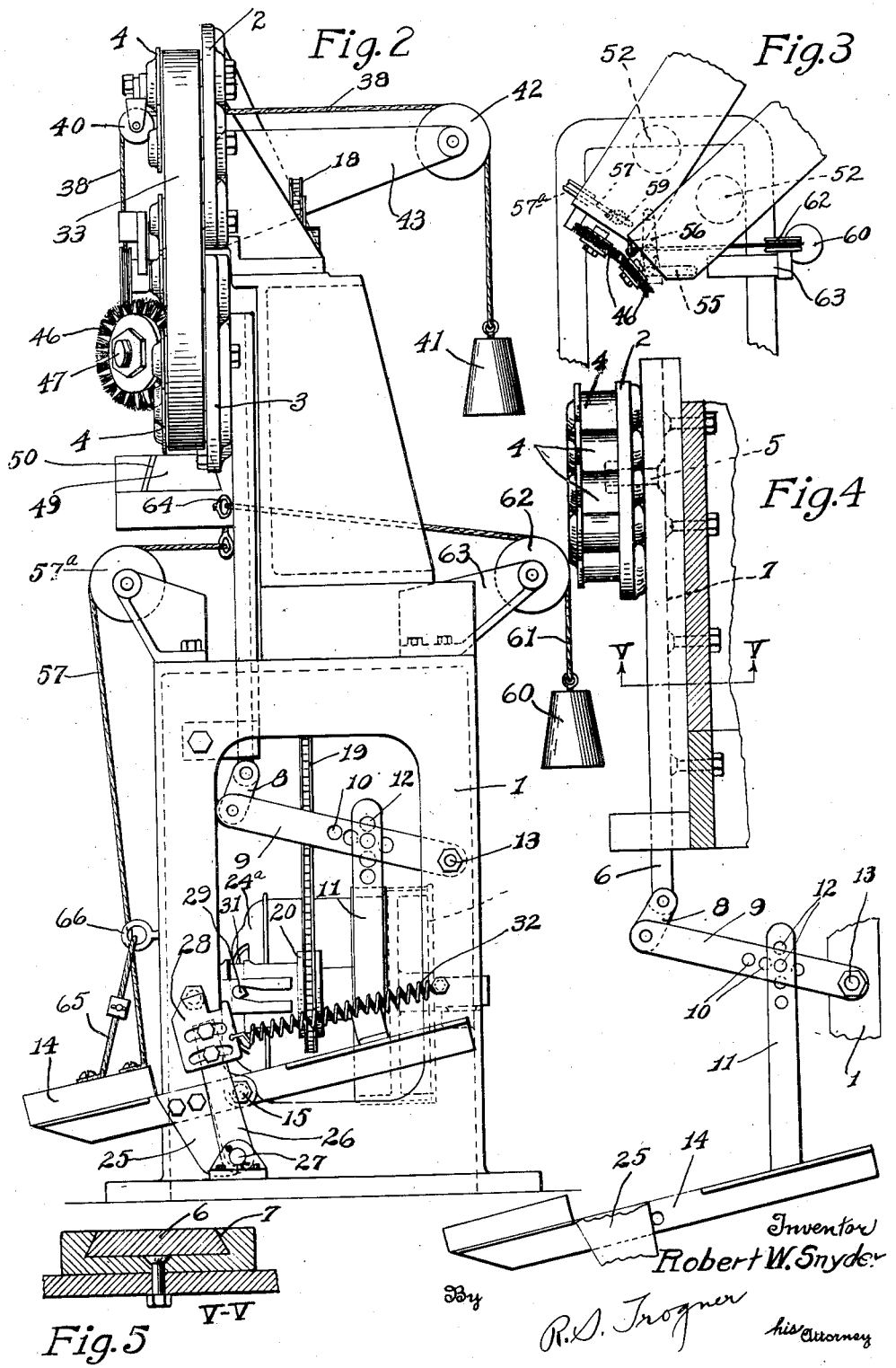

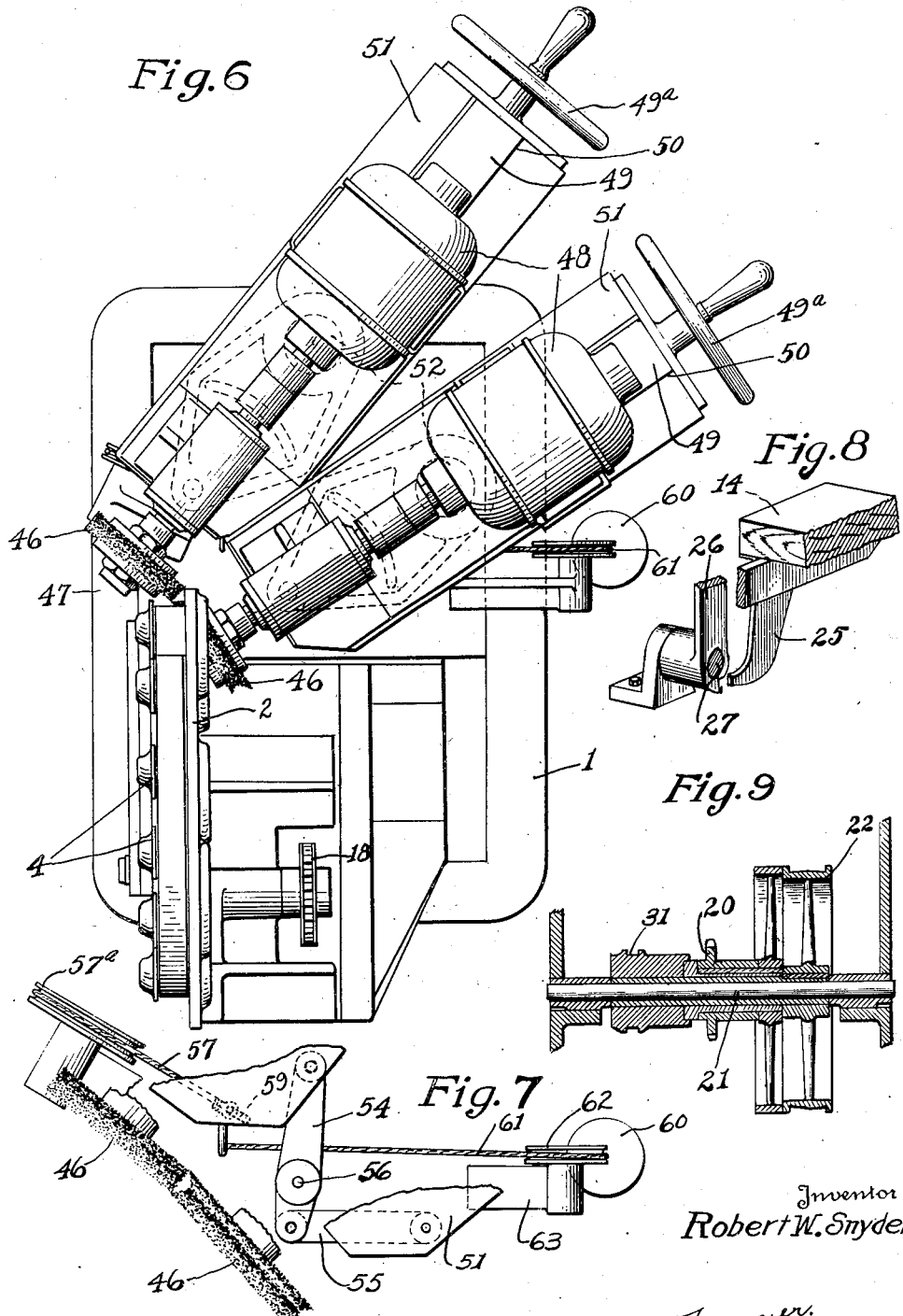

1,568,634

UNITED STATES PATENT OFFICE.

ROBERT W. SNYDER, OF AKRON, OHIO, ASSIGNOR TO THE GOODYEAR TIRE & RUBBER COMPANY, OF AKRON, OHIO, A CORPORATION OF OHIO.

BEAD-BUFFING MACHINE.

Application filed September 30, 1920. Serial No. 413,689.

*To all whom it may concern:*

Be it known that I, ROBERT W. SNYDER, a citizen of the United States, residing at Akron, in the county of Summit and State of Ohio, have invented new and useful Improvements in Bead-Buffing Machines, of which the following is a specification.

My invention relates to buffing machines for tire beads, and it has for its primary object the construction of a machine which shall reduce the manual operations necessary in properly preparing a tire bead for embodying it in a tire casing.

Heretofore tire beads, particularly beads composed of fabric and rubber, such as those embodied in clincher tires, have been finished preparatory to embodying them in a tire casing by a number of manual operations supplemented by suitable machines.

The primary object of my invention, therefore, resides in the construction of a machine which shall so reduce the manual labor required in preparing a bead as to materially decrease its cost and which shall promote quantity production thereof.

A still further object of my invention resides in the construction of a buffing machine for tire beads which shall so clean the exterior surfaces of the bead as to insure good adhesion between the tire bead and the adjacent material of the casing in which it is embodied.

With these and other objects in view my invention will be more fully described, illustrated in the drawings, in which like numerals indicate like parts, and then more fully pointed out in the claims.

In the drawings, Figure 1 is a side elevation of a bead buffing machine constructed in accordance with my invention.

Figure 2 is an end elevation of the machine shown in Figure 1.

Figure 3 is a detail view of abrasive members and supports therefor;

Figure 4 is a detail view of a system of levers for adjusting a bead supporting member;

Figure 5 is a sectional view taken substantially along the line V—V of Figure 4;

Figure 6 is a plan view of the machine shown in Figures 1 and 2.

Figure 7 is a detail view of means for adjusting the abrasive members;

Figure 8 is a detail view of means for actuating a control clutch; and

Figure 9 is a sectional view showing an arrangement of driving members.

In practicing my invention a machine may be constructed in accordance therewith by employing a plurality of supporting members one of which is adjustable relative to the other and upon which are mounted a plurality of idler pulleys adapted to carry an endless belt upon which the tire bead may be disposed. The belt is driven by any suitable means, such as an electric motor, properly connected to a drive pulley mounted upon the stationary supporting member. Means is also provided for maintaining the proper tension upon the belt when the adjustable supporting member is moved to permit of disposing the tire bead upon the carrying belt.

A plurality of abrasive members, such as wire wheels, are suitably mounted to engage the tire bead in such manner as to insure the trimming of any rough edges and the proper cleaning of its surfaces. The abrasive wheels are preferably each provided with an independent drive, such as an electric motor, the mechanism being mounted so as to be adjustable in a longitudinal direction, and at least one of the wheels is adjustable in a lateral direction with respect to the other.

As shown in Figure 1, the machine comprises a frame 1 upon which is mounted a stationary supporting member 2 and an adjustable supporting member 3, each of the supporting members carrying a plurality of idler pulleys 4 mounted adjacent the periphery thereof. The supporting member 3 is secured by means on bolts 5 to a wedge shaped bar 6 adapted to slide in a channel 7 provided in one of the upright members of the frame 1, as best shown in Figures 4 and 5.

The member 6 is pivotally connected by a link 8 to a lever arm 9 provided with a series of openings 10, by means of which adjustable connection may be made to a lever arm 11, which is also provided with a series of openings 12. The lever arm 9 is, of course, pivotally mounted upon one upright member of the frame 1, as indicated at 13. The system of levers above described, and consequently the member 6, may be actuated by means of a foot pedal 14 pivotally mounted adjacent its central portion upon the frame 1, as indicated at 15.

It will be appreciated from the foregoing description that the supporting member 3 may be raised by depressing the foot pedal 14, which engages the lever arm 11 and imparts movement to the member 6 which is connected to the supporting member 3. When the foot pedal is released the supporting member 3 drops, due to the force of gravity, to its lowermost position, as will be more fully described hereinafter.

In order to provide means for rotating a tire bead about the idler pulleys mounted upon the supporting members 2 and 3, a drive pulley 16 is mounted upon the stationary supporting member 2 upon a drive shaft 17 which has a sprocket wheel 18 keyed to its other end. The sprocket wheel 18 is connected by a chain 19 to another sprocket wheel 20 mounted upon a drive shaft 21, which is rigidly connected to a drive wheel 22 adapted to be driven through a belt connection 23 by a drive wheel 24. The drive wheel 24 is driven by any suitable means; such as an electric motor, indicated at 24ª.

In order to facilitate disposing a tire bead on the machine, a clutch mechanism is provided for stopping the rotation of the drive pulleys and sprocket wheels which impart movement to the tire bead. Because of the fact that any known clutch mechanism may be employed it is not believed to be necessary to describe the construction of the clutch mechanism itself. However, the means for operating the clutch mechanism is clearly shown in the drawings as constituting a lever arm 25 which is rigidly mounted upon the foot pedal 14 and is so formed at its lower end as to be adapted to engage a lever arm 26 pivotally mounted at its lower end to the frame 1, as indicated at 27. The arm 26 has a latching member 28 adjustably secured to its upper end, which is adapted to engage an extending arm 29 of a guide member 30, which is seated in a recess 31 of the clutch member. The latching member 28 is connected by means of a spring 32 to the frame 1 in such manner as to tend to maintain the clutch in its forward position and connect the driving motor to the driving wheels. When the pedal 14 is depressed, preparatory to removing a tire bead from the machine, the lever arm 25 engages the cooperating lever arm 26 which is forced out of engagement with the arm 29, thus releasing the clutch mechanism and stopping the drive of the machine.

The tire bead is carried about the idler pulleys by means of a belt 33 which is trained about the idler pulleys 4 and the drive pulley 16. In order to maintain proper tension upon the carrying belt 33, a plurality of lever arms 34 and 35 are loosely mounted upon the shaft 17 and carry idler pulleys 36 upon their free ends. The arm 35 is also provided with a pulley 37 about which a cable 38 is disposed and connected to an extending arm 39 which is secured to the free end of the lever arm 34. The other end of the cable is passed over an idler pulley 40, through a suitable opening in the supporting member 2 and connected to a weight 41, which is suspended from a pulley 42 mounted upon a bracket 43 secured to the frame 1.

It will be apparent that the weight 41 tends to counterbalance the weight of the adjustable supporting member 3 and to draw the lever arm 35 in a vertical direction, thus increasing the tension upon the belt 33. A resilient connection is made between the lever arm 35 and the supporting member 3 by means of a spring 44 which permits of movement of the lever arm, and which aids the action of the weight 41 in maintaining the proper tension on the belt 33 to insure its rotation over the idler pulleys 4.

A bead 45 is mounted for rotation by depressing the foot pedal 14 which, as above described, raises the supporting member 3 and permits of its disposal upon the belt 33. The foot pedal is then released and the member 3 assumes its lower position and draws the bead 45 into close engagement with a carrying belt 33. Means for trimming and buffing the bead 45 is secured by mounting a plurality of wire wheels 46 upon separate drive shafts 47, each of which is driven by a motor 48.

In order to compensate for wear of the abrasive wheels 46 and to insure proper disposition of the wheels to engage the bead, each of the wheels and its driving connection is mounted upon a wedge shaped slide 49 seated in a channel 50 of a supporting member 51. The wheels may be adjusted longitudinally by means of screws (not shown) operating on the slides 49 actuated by hand wheels 49ª. Lateral adjustment of the wheels with respect to each other is obtained by mounting the member 51 upon a pivot 52 adapted to revolve in a bearing member 53, which is mounted upon the frame 1.

In order that it should only be necessary to move one of the supports for the wheels to secure movement in a lateral direction of both of the wheels, a plurality of lever arms 54 and 55 are pivotally mounted upon the frame 1, as indicated at 56, and are pivotally secured together. The lever arms are connected between the supporting members for the wheels 46 in such manner as to insure their movement toward and away from each other, depending upon the direction of the force exerted thereupon.

A cable 57, supported by a pulley 57ª, is connected to the pedal 14, as indicated at 58, and to an eye-bolt 59 so that when the pedal 14 is depressed the mounting for the brush connected thereto is moved in lateral direction out of engagement with the bead 45, and the other mounting for the other abrasive wheel is forced in the opposite direction by means of the links 54 and 55, as will be apparent from the drawings.

In order to automatically return the abrasive wheels 46 to an operative position in engagement with the bead 45 when the pedal 14 is released, a weight 60 is connected by cable 61, which is passed over a pulley 62 carried by a bracket 63 mounted upon the frame 1, to an eye-bolt 64 rigidly secured to the same support 51 as the eye-bolt 59. It will be clear that when the pedal is released the weight 60 will force the brushes back into engagement and in an operative position with respect to a bead placed upon the belt 33.

Since the machine, as a whole, is constructed to reduce the amount of labor necessary in properly preparing a tire bead, an adjustable cable 65 is connected to the pedal 14 and to an eye-bolt 66 rigidly mounted upon the frame 1, to limit the extent of downward movement of the pedal 14 to a sufficient degree to permit of properly disposing a bead in an operative position on the machine. The limiting cable is made adjustable in order to permit of varying the degree of movement of the foot pedal when beads of different sizes are operated upon.

Although a clutch mechanism has been shown in the drawings and described as embodied in the machine, such mechanism may be omitted from the construction of the machine without interfering with its efficient operation, because of the fact that when the foot pedal is depressed a tire bead may readily be disposed upon the carrying belt without interrupting the drive of the machine.

In so far as the manual operation required in properly preparing a tire bead is concerned all that is necessary is for the operator to depress the foot pedal 14, as above described, which raises the lower supporting member 3 and moves the abrasive wheels to a sufficient distance apart that a tire bead may readily be disposed upon the carrying belt 33. The foot pedal is then released and the supporting member 3 assumes its initial position, thus drawing the bead into close engagement with the carrying belt, and the abrasive wheels, at the same time, engage the bead which is permitted to remain on the machine for a short time until it is thoroughly cleaned and any rough edges thereof properly trimmed. The operation is then repeated and the prepared bead is removed in the same manner as that in which it is placed upon the machine.

The machine may be kept free from the dirt and trimmings removed from the bead by enclosing the abrasive wheels in sheet metal hoods which may be attached to a vacuum system in order to remove the dirt as it is brushed from the bead. Such enclosing means for the brushes have not been shown in the drawings, in order to clarify the construction of the mounting of the brushes and to clearly present their disposition with respect to each other and to the bead.

Although I have shown and described a machine constructed in accordance with my invention, it will be obvious that minor changes may be made in the construction thereof without departing from the spirit or scope of my invention, and I desire therefore that no limitations shall be imposed except such as are indicated in the appended claims.

What I claim is:

1. A machine for buffing tire beads comprising means for supporting and rotating an annular bead, means for maintaining the bead under constant tension and means for buffing the entire surface of the bead.

2. A machine for buffing tire beads comprising means for rotating and tensioning an annualr bead, a plurality of members for trimming and buffing the entire surface of the bead, and means for independently adjusting the position of each of the members with respect to each other.

3. A machine for buffing tire beads comprising means for rotatably supporting and tensioning an annular bead, a plurality of abrasive wheels for trimming and buffing the bead, and means for driving each of the wheels independently.

4. A machine for buffing tire beads comprising a plurality of supporting members one of which is adjustable with respect to the other, rotatable members mounted upon the supporting members, means for moving a bead over the rotatable members, and means for trimming and buffing the bead.

5. A machine for buffing tire beads comprising a plurality of supporting members one of which is adjustable relative to the other, rotatable members mounted upon the supporting members, means for moving a bead over the rotatable members, and a plurality of abrasive wheels for trimming and buffing the bead.

6. A machine for buffing tire beads comprising a plurality of supporting members, one of which is adjustable with respect to the other, rotatable members mounted upon the supporting members, means for moving a bead over the rotatable members, a plurality of abrasive wheels for buffing the bead, and means for driving the wheels independently of each other.

7. A machine for buffing tire beads comprising a plurality of supporting members one of which is adjustable with respect to the other, rotatable members mounted upon the supporting members, means for moving a bead over the rotatable members, a plurality of abrasive wheels for buffing the bead, means for adjusting the position of the wheels relative to each other, and means for driving the wheels independently of each other.

8. A machine for buffing tire beads comprising a plurality of supporting members one of which is adjustable relative to the other, rotatable members mounted upon the supporting members, means for moving a bead over the rotatable members, a plurality of abrasive wheels adapted to engage the bead, means for independently driving the wheels, means for adjusting the position of both of the wheels longitudinally, and means for moving one of the wheels laterally with respect to the other.

9. A machine for buffing tire beads comprising a plurality of supporting members one of which is adjustable relative to the other, rotatable members mounted upon the supporting members, means for moving a bead over the rotatable members, a plurality of abrasive wheels adapted to engage the bead, means for independently driving the wheels, means for independently adjusting the position of each of the wheels longitudinally, and means for moving one of the wheels laterally with respect to the other.

10. A machine for buffing tire beads comprising a plurality of supporting members one of which is adjustable relative to the other, rotatable members mounted upon the supporting members, a belt trained about the rotatable members for rotating a bead, a plurality of abrasive wheels adapted to engage the bead, means for independently driving the wheels, means for independently adjusting the position of each of the wheels longitudinally, and means for moving one of the wheels laterally with respect to the other.

11. A machine for buffing tire beads comprising a plurality of supporting members one of which is adjustable relative to the other, manually operable means for adjusting said supporting member, rotatable members mounted upon the supporting members, means for moving a bead over the rotatable members, a plurality of abrasive wheels adapted to engage the bead, means for independently driving the wheels, means for independently adjusting the position of each of the wheels longitudinally, means for moving one of the wheels laterally with respect to the other, and means actuated by the means for adjusting the supporting member for interrupting the operation of the machine.

12. A machine for buffing tire beads comprising adjustable means for rotatably supporting an annular bead, means for buffing the bead, and means for interrupting the operation of the machine.

13. A machine for buffing tire beads comprising a plurality of supporting members, one of which is adjustable with respect to the other, rotatable members mounted upon the supporting members, a belt trained about the rotatable members for carrying the bead, means for maintaining proper tension on the belt, a plurality of abrasive wheels adapted to engage the bead carried by the belt, means for driving the wheels independently of each other, means for independently adjusting the position of each of the wheels longitudinally, and means for effecting a lateral adjustment of the wheels.

In witness whereof, I have hereunto signed my name.

ROBERT W. SNYDER.